United States Patent [19]

Zimmer

[11] Patent Number: 4,625,837
[45] Date of Patent: Dec. 2, 1986

[54] HOLDING BRAKE FOR MANIPULATOR

[75] Inventor: Ernst Zimmer, Friedberg, Fed. Rep. of Germany

[73] Assignee: Kuka Schweissanlagen + Roboter GmbH, Augsburg, Fed. Rep. of Germany

[21] Appl. No.: 714,698

[22] Filed: Mar. 21, 1985

Related U.S. Application Data

[63] Continuation-in-part of Ser. No. 611,387, May 17, 1984, abandoned, which is a continuation of Ser. No. 326,891, Dec. 2, 1981, abandoned.

[30] Foreign Application Priority Data

Dec. 6, 1980 [DE] Fed. Rep. of Germany ....... 3046156

[51] Int. Cl.[4] .............................................. F16D 65/24
[52] U.S. Cl. ....................................... 188/170; 92/75; 92/107; 92/130 A; 188/366; 192/91 A
[58] Field of Search ...................... 188/170, 366, 367; 303/13; 91/6; 92/75, 107, 130 A; 192/91 A

[56] References Cited

U.S. PATENT DOCUMENTS

| | | | |
|---|---|---|---|
| 1,961,207 | 6/1934 | Dierfeld | 188/366 |
| 2,345,410 | 3/1944 | Mierley | 192/91 A |
| 2,502,798 | 4/1950 | Nabstedt et al. | 192/91 A |
| 2,543,252 | 2/1951 | Nabstedt et al. | 188/170 X |
| 2,698,676 | 1/1955 | Eason | 188/170 |
| 2,775,319 | 12/1956 | Friedman | 188/170 |
| 2,854,097 | 9/1958 | Lucker et al. | 188/72.3 X |
| 2,865,481 | 12/1958 | Teramala | 192/91 A |
| 2,889,021 | 6/1959 | Bass et al. | 188/170 X |
| 3,205,990 | 9/1965 | Comstock, 3rd | 192/91 A X |
| 3,500,970 | 3/1970 | Schilling | 188/170 |
| 3,777,857 | 12/1973 | Hughes | 188/170 |
| 3,889,784 | 6/1975 | Hanks | 188/366 X |
| 3,927,737 | 12/1975 | Prillinger et al. | 188/170 X |
| 4,078,639 | 3/1978 | Beneke | 188/170 X |
| 4,358,000 | 11/1982 | Cumming | 188/170 |

FOREIGN PATENT DOCUMENTS

| | | | |
|---|---|---|---|
| 53773 | 6/1982 | European Pat. Off. | 188/72.3 |
| 819186 | 10/1951 | Fed. Rep. of Germany | 192/91 A |
| 1273278 | 7/1968 | Fed. Rep. of Germany | |
| 2453472 | 5/1976 | Fed. Rep. of Germany | 188/170 |
| 2510760 | 9/1976 | Fed. Rep. of Germany | |
| 3046156 | 1/1983 | Fed. Rep. of Germany | |
| 1422956 | 11/1965 | France | |
| 1051281 | 12/1966 | United Kingdom | 188/72.3 |

*Primary Examiner*—George E. A. Halvosa
*Attorney, Agent, or Firm*—Karl F. Ross; Herbert Dubno

[57] ABSTRACT

A brake effective between a rotating part and a nonrotating part has a substantially nondeformable brake disk secured to one of the parts, centered on an axis, and having a pair of axially oppositely directed brake-disk faces. A housing is secured to the other of the parts, at least partially surrounds the brake disk, and has a pair of end walls having wall faces axially confronting the respective disk faces. Respective brake elements are limitedly axially displaceable between the wall faces and the respective disk faces and engageable with the respective disk faces. Formations on the elements and housing prevent the elements from rotating relative to the housing. Spring packs between the brake elements and the respective wall face urge the elements with a substantially constant force axially together into braking engagement with the disk. Seals between the brake elements and housing define a pressurizable chamber between the brake elements. The chamber can be pressurized to move the elements axially apart and out of braking engagement with the disk.

14 Claims, 7 Drawing Figures

HOLDING BRAKE FOR MANIPULATOR

CROSS REFERENCE TO RELATED APPLICATION

This application is a continuation-in-part of Ser. No. 611,387, filed May 17, 1984, now abandoned, as a continuation of Ser. No. 326,891 of Dec. 2, 1981, now abandoned.

FIELD OF THE INVENTION

The present invention relates to a holding brake for use between two relatively rotatable parts. More particularly this invention concerns a brake of the type that is used on a manipulator and that only allows the two parts to move relative to each other when the brake is actuated to remove the braking action.

BACKGROUND OF THE INVENTION

A holding brake of the type used on a manipulator normally prevents the two relatively rotatable parts it acts on from rotating. Only when the brake is energized, normally by feeding a fluid under pressure to it, does it allow the two parts to rotate relative to each other. In a manipulator, this brake holds the joints rigid until they are called on to flex or otherwise move.

It is essential that such a brake hold the two parts absolutely rigidly when it is not energized. In addition it should be able to clamp these parts and unclamp them virtually instantaneously. In a multijoint manipulator arm, extreme precision of operation is essential because displacement errors in one joint are amplified by those in another, so that a seemingly tolerable error at one location can lead synergistically to an intolerable one at another.

The standard such brake has a disk mounted on one of the parts and brake elements that can clamp this disk. Typically the disk is somewhat flexible, that is it can be elastically deformed to a limited degree. The disk is clamped by a movable brake element against a fixed element to arrest the rotating and non-rotating parts relative to each other. Teeth between the brake elements and the parts carrying them prevent them from moving relative to this part.

The considerable axial play that must be provided to both sides of such an axially deformable disk, as well as the play between the teeth and the parts they interconnect, frequently make it impossible for the brake to close as rapidly and to hold as solidly as is necessary. What is more, such brakes frequently are very noisy, emitting a clank each time they are actuated, so that operation of a manipulator equipped with them is fairly noisy.

OBJECTS OF THE INVENTION

It is therefore an object of the present invention to provide an improved holding brake.

Another object is the provision of such a holding brake which overcomes the above-given disadvantages.

Yet another object is to provide a holding brake which operates rapidly and silently, and which rigidly connects together the two parts it is connected between.

Still another object of my invention is to provide an improved manipulator brake which extends the principles of the above-identified application.

SUMMARY OF THE INVENTION

These objects are attained according to the instant invention in a brake effective between a rotating part and a nonrotating part. The brake according to this invention has a substantially nondeformable brake disk secured to one of the parts, centered on an axis, and having a pair of axially oppositely directed brake-disk faces. A housing is secured to the other of the parts, at least partially surrounds the brake disk, and has a pair of end walls having wall faces axially confronting the respective disk faces. Respective brake elements are limitedly axially displaceable between the wall faces and the respective disk faces and engageable with the respective disk faces. Means is provided including formations on the elements and housing for preventing the elements from rotating relative to the housing. Biasing means between the brake elements and the respective wall face urges the elements with a substantially constant force axially together into braking engagement with the disk. Seal means between the brake elements and housing defines a pressurizable chamber between the brake elements. Means including a plurality of valves uniformly spaced above the axis is provided for pressurizing the chamber and thereby moving the elements axially apart and out of braking engagement with the disk. Thus at least two such valves are provided.

With the system according to the instant invention it is possible to reduce the play between the rigid disk and the brake elements, that is the stroke of these elements to a very small dimension. In fact it is possible to reduce the play to as little as 0.15 mm. Of course the reaction time of such a brake is correspondingly reduced. What is more it has been found that a noise reduction of more than 5 dbA is obtained with the system of this invention. Providing the actuation chamber between the two disks, rather than providing a separate actuation chamber for each disk, ensures perfectly synchronous action. In addition the chamber can be of extremely small volume so that reaction time will further be reduced.

As noted that means for pressurizing includes at least two valves. These valves can be carried directly on the brake housing, or even on one of the brake elements and, when two are provided, are diametrically opposite. When a larger number of valves are provided, they are angularly equispaced in an axial symmetrical array. The brake according to this invention can work in tandem with another brake, for instance a motor or generator brake.

The biasing means according to the invention includes respective pluralities of spring packs angularly equispaced about the axis between the elements and the respective wall faces. The biasing means may also include at least one permanent magnet.

According to the invention the chamber lies radially outside the disk and is radially outwardly delimited by the housing. The elements may have element faces engageable with the respective disk faces. In this case the biasing means is radially mainly between the element faces and the chamber. In addition, in order to ensure that the two brake elements move smoothly apart without canting, the chamber lies radially outside the disk and is radially outwardly delimited by the housing. The seal means includes respective seal rings carried on the elements and radially outwardly engaging the housing between the walls thereof. One of the elements can have a hub extending axially into the other of the elements. In this case the seal means includes a seal ring between the other element and the hub of the one element.

In accordance with another inventive feature the elements have confronting element faces radially outside the disk and formed with confronting grooves centered on the axis. The seal means includes a rigid ring in the grooves and two respective seal rings axially flanking the rigid ring and sealingly engaging the elements in the respective grooves.

It is also possible according to this invention for the chamber to lie radially outside the disk and to be radially outwardly delimited by the housing. To this end the elements have beveled-off outer peripheries in the chamber.

In order to eliminate any angular play in the system of this invention, the formations include axially aligned and confronting recesses in the elements and side walls, and respective keys snugly fitting in the confronting recesses. These recesses of the side wall are throughgoing and the keys are fixed to the side walls. In this case the biasing means includes respective pluralities of spring packs angularly equispaced about the axis between the elements and the respective wall faces, the recesses being between or angularly alternating with the packs.

To make the assembly as compact as possible one of the elements axially overreaches the disk and has an inner periphery spaced radially outside the disk. This feature makes it easier to conduct away frictionally generated heat.

It is possible according to this invention for the disk to be fixed to the rotatable or nonrotatable part and for the brake elements to be fixed to the other part. Either way the system will function rapidly and silently.

BRIEF DESCRIPTION OF THE DRAWING

The above and other features and advantages will become more readily apparent from the following, reference being made to the accompanying drawing in which.

SPECIFIC DESCRIPTION

Figure 1:
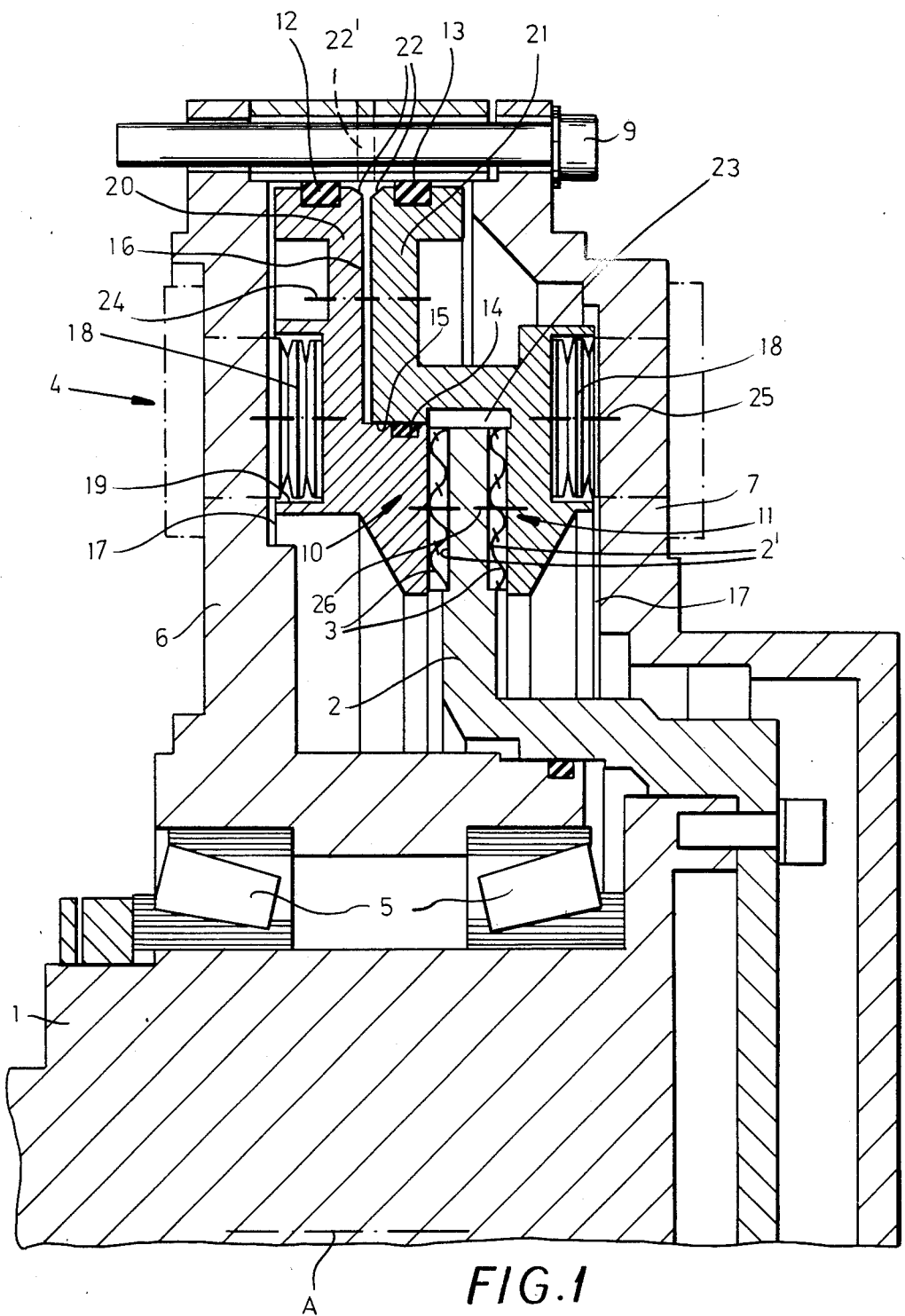
FIG. 1 is an axial section through a holding brake according to the present invention.

A shaft 1 rotatable about an axis A as seen in FIG. 1 is bolted to a rigid brake disk 2 whose axially oppositely directed faces 2' carry standard annular brake pads 3. A housing indicated generally at 4 constitutes the nonrotating part and is supported by a roller bearing 5 on the rotating part 1. This housing 4 has a pair of axially spaced end plates 6 and 7 joined together by a cylindrical outer wall 8 having bolts 9 going through the end walls 6 and 7.

A pair of brake elements indicated generally at 10 and 11 have outer peripheries provided with respective seal rings 12 and 13 that glide on the inner surface of the cylindrical side wall 8. In addition the element 10 slides via another seal ring 14 on an inner peripheral surface 15 of the element 11. Thus a chamber 16 is formed between these two elements 10 and 11, which have beveled-off outer peripheries 22 that prevent these elements 10 and 11 from blocking an inlet port 22' fed with a fluid, normally air, under pressure from valves 27 (FIG. 2) which are diametrically opposite one another. The element 11 is spaced radially outward from the disk 2 to form an annular space or chamber 23 around this disk 2.

The two elements 10 and 11 are limitedly axially shiftable in the housing 4, through a play 17 of about 0.15 mm. This play 17 is axially outside the elements 10 and 11 in the illustrated braking position, and lies between the elements 10 and 11 and the brakeshoes 3 in an outer nonbraking or freezing position.

Six angularly equispaced spring packs 18 of belleville washers bear axially between each of the elements 10 and 11 and the inner face of the respective end walls 6 and 7. These spring packs force the elements 10 and 11 axially together to clamp the disk 2 when the chamber 16 is not pressurized. Recesses 19 formed in the elements 10 and 11 receive these spring packs 18.

With this system, therefore, the force exerted by pressurized fluid in the chamber 16 between the radial outer portion 20 and 21 of the elements 10 and 11 will be effective along an annulus illustrated by the line of application 24 in FIG. 1. The force exerted by the spring packs 18 will be effective along lines of application 25 lying radially inside the lines 24, and the force exerted by the elements 10 and 11 on the disk 2 will be effective along an annulus illustrated by the line of application 26 lying radially inside the lines 25. Thus forces within the system will be perfectly balanced.

Figure 4:
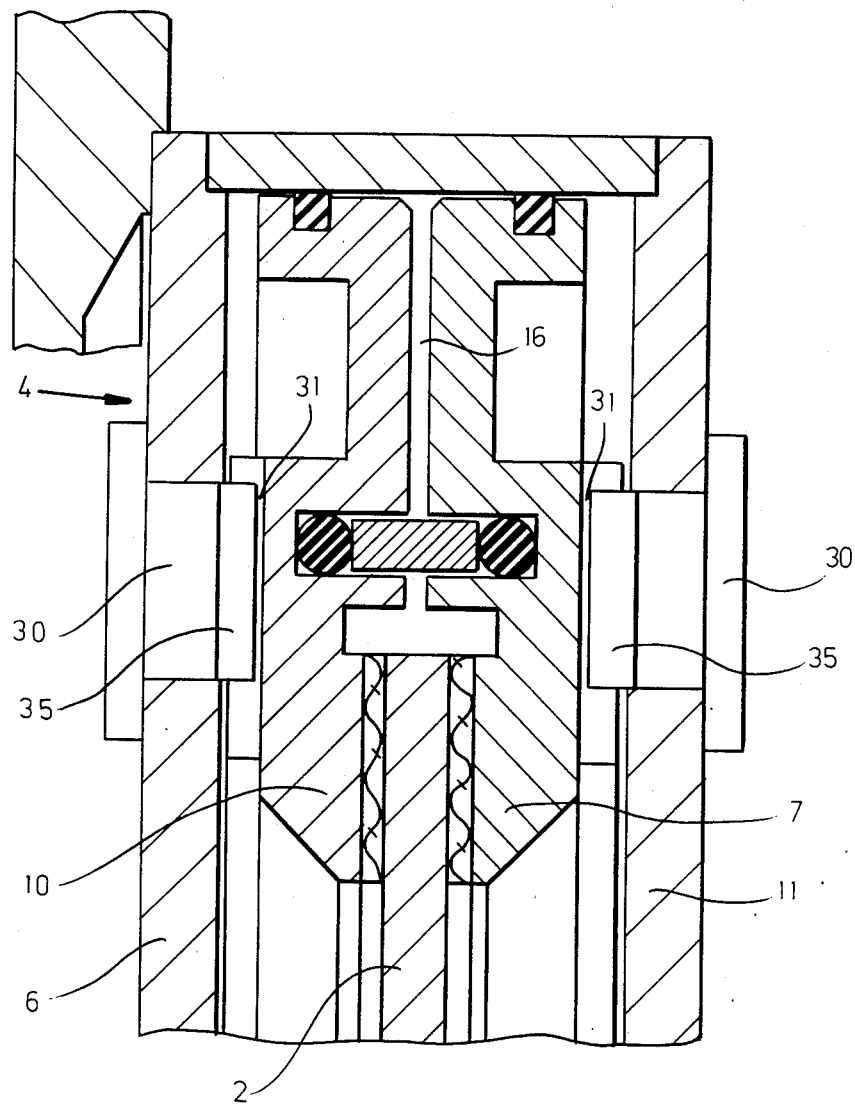
Figure 5:
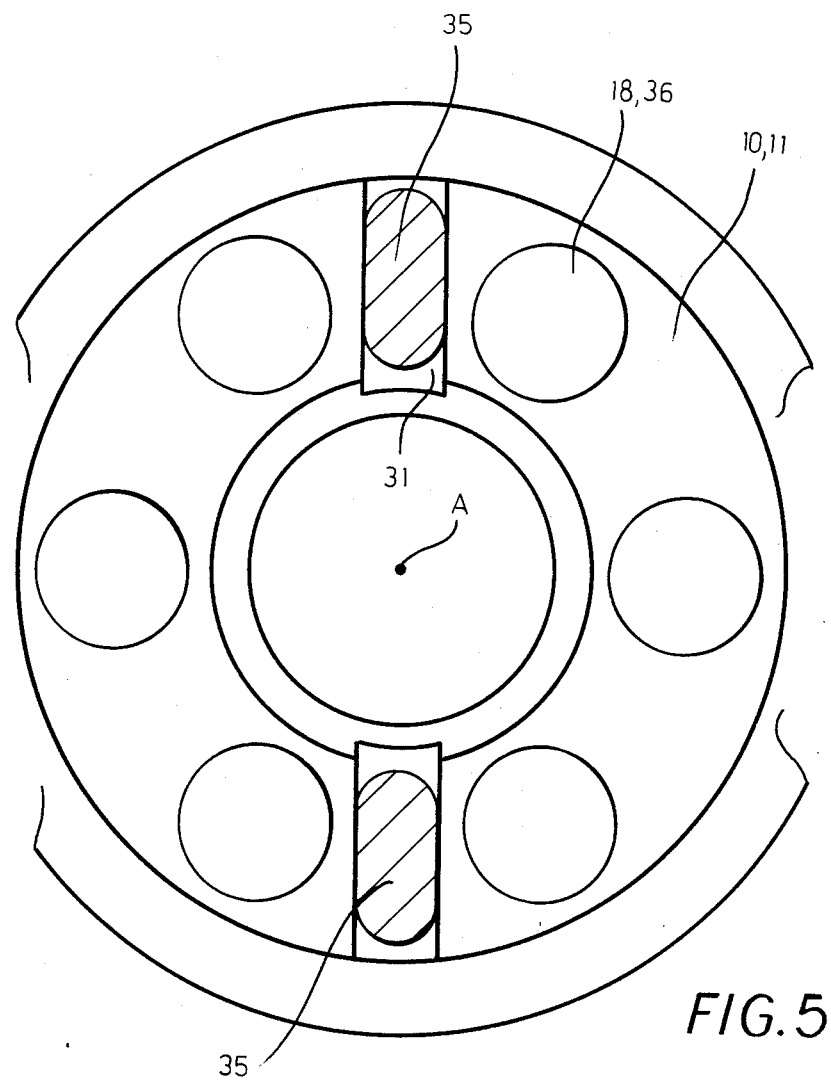
FIG. 5 is an end view of elements of the system of FIG. 1.

As seen also in FIGS. 4 and 5 the elements 10 and 11 are fixed angularly in the housing by means of ends 35 of keys 30 that extend through radially extending slots 31 in the walls 6 and 7 into similar such slots 31 in the outer faces of the elements 10 and 11. These keys 30 are T-shaped and bolted to the end walls 6 and 7. Two such keys 30 diametrically opposite each other effectively block the elements 10 and 11 from moving angularly. Since these elements 10 and 11 move through a very short axial stroke or play 17 of 0.15 mm, it is possible for the ends 35 to fit very snugly into the slots 31 of the elements 10 and 11 without binding and preventing them from moving freely axially.

Figure 2:
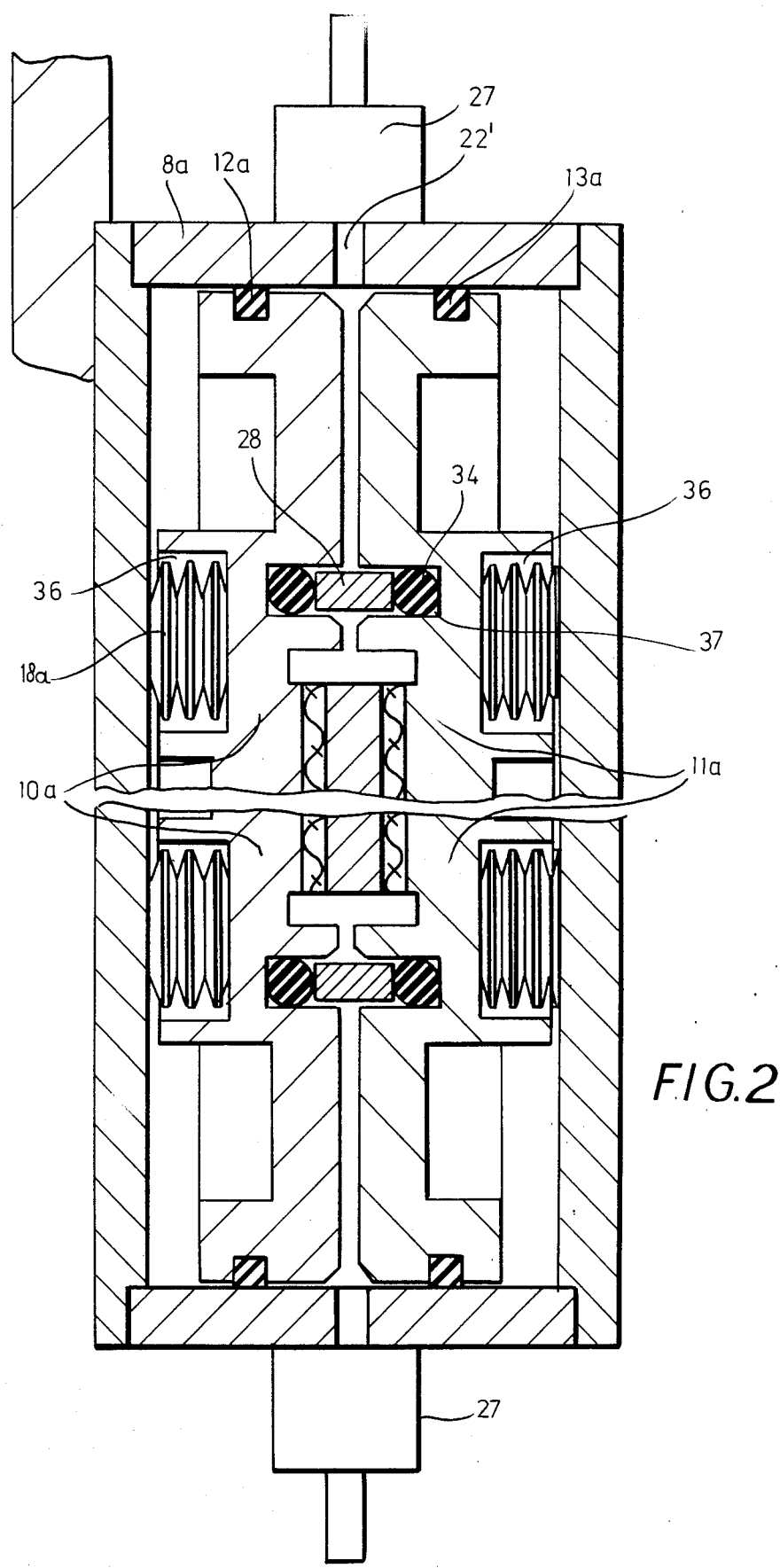
FIG. 2 is a section through a portion of another brake according to the instant invention.

FIG. 2 shows an arrangement wherein two mirror-symmetrical brake elements 10a and 11a flank a disk. These elements 10a and 11a are formed with axially outwardly open recesses 36 receiving the spring packs 18a. In addition the elements 10a and 11a are formed with confronting axially inwardly open grooves 37 receiving a ring or sleeve 28 flanked by a pair of O-ring seals 34. On their outer peripheries they engage via seal rings 12a and 13a against the inner surface of the side wall 8a of the system. Such an arrangement can be produced relatively cheaply since both of the piston-like brake elements or disks 10a and 11a are virtually identical.

Figure 3:
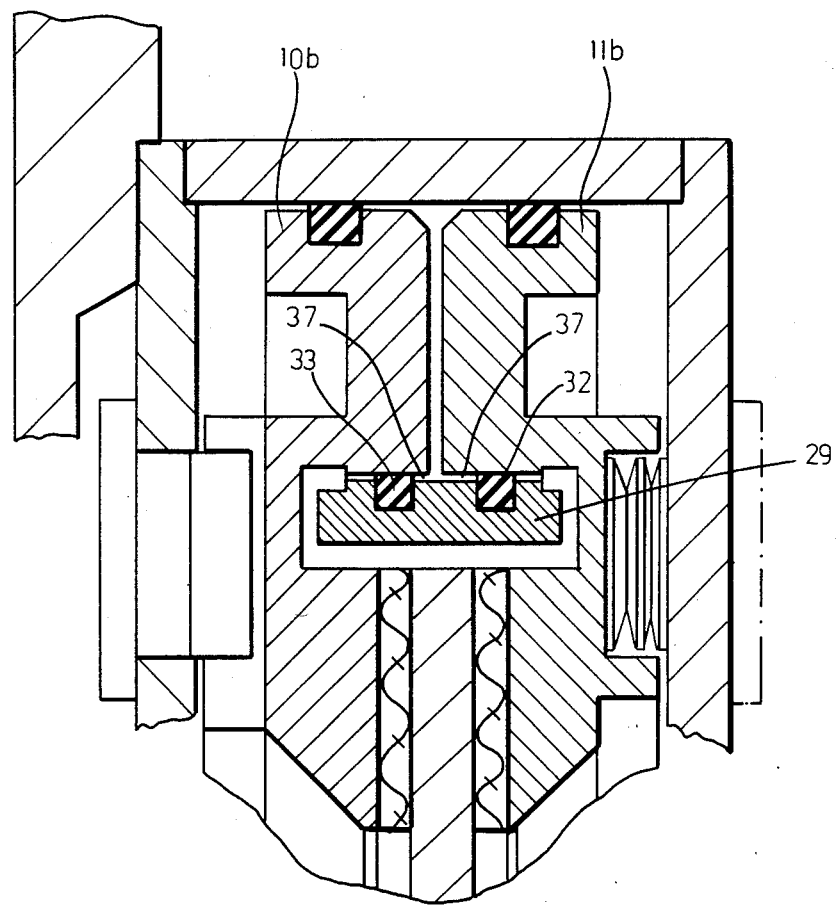
FIGS. 3 and 4 are sections similar to FIG. 2 showing two other brakes in accordance with this invention.

A similar arrangement is seen in FIG. 3, but here the two confronting annular grooves 37 receive a sleeve 29 bearing radially outward via ring seals 32 and 33 on the elements 11b and 10b. Otherwise this arrangement is identical to that of FIG. 2.

The arrangement of FIG. 4, discussed briefly above, is substantially identical to that of FIG. 2.

Figure 6:
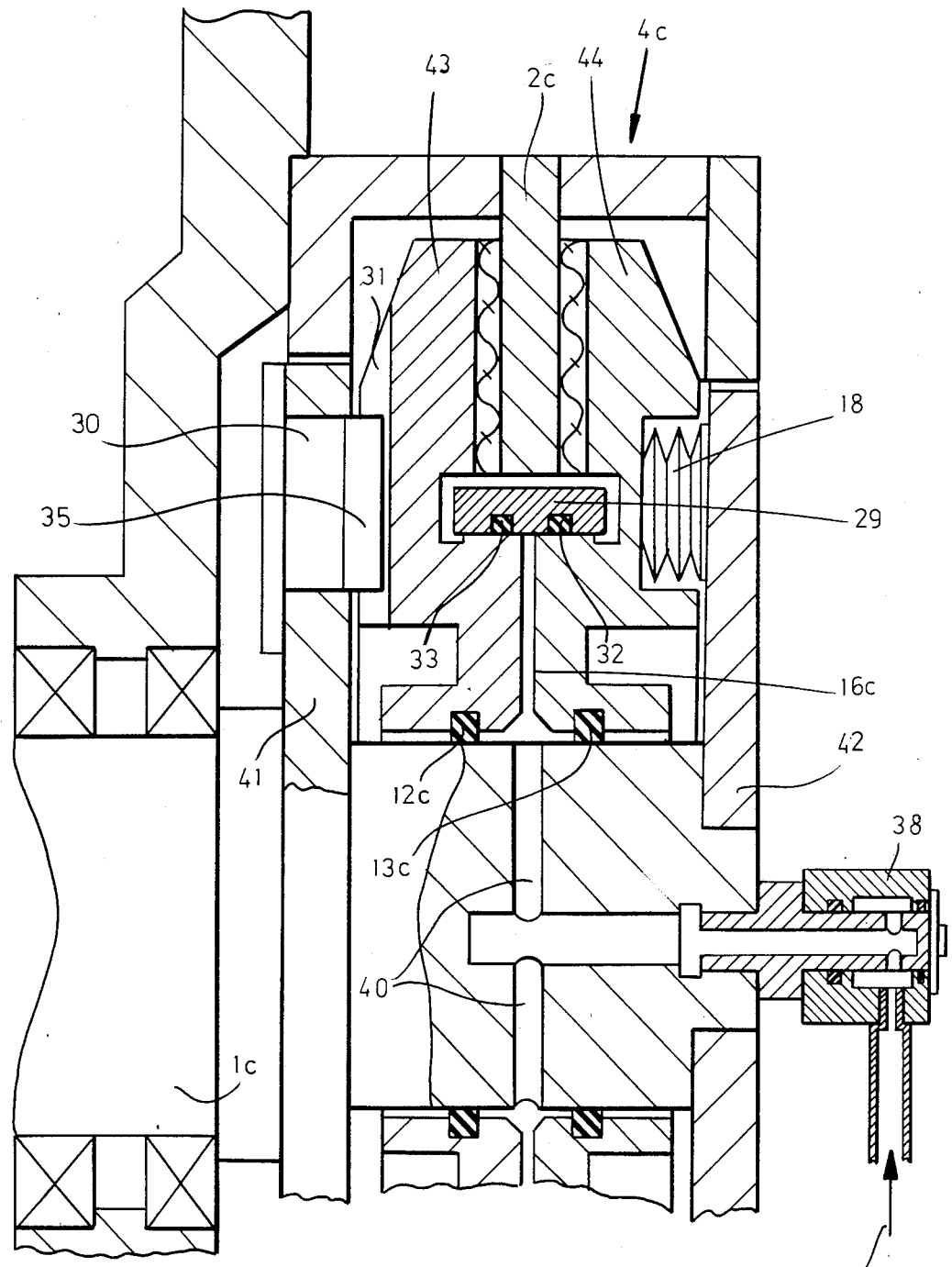
FIG. 6 is a view similar to FIG. 1 showing another system according to the present invention.

The brake of FIG. 6 is functionally identical to that of FIG. 1, except that here the housing 4c carries the disk 2c and the rotatable part 1c carries the two elements 43 and 44 functionally identical to the elements 10 and 11 on support plates 41 and 42. These elements 43 and 44 are formed with grooves receiving the sleeve 29 and seals 32 and 33, like FIG. 3.

In this case, however, the chamber 16c lies radially within the spring packs 18 and is bounded by the sleeve 29 and its seals 32 and 33 and by two seals 12c and 13c which ride on the shaft forming the rotating part 1c. Passages 40 in this shaft 1c communicate with a fitting 38 connected to a tube 39 that can supply compressed air to the assembly. This system therefore has all of the advantages of the systems described above, but in a different configuration.

Figure 7:
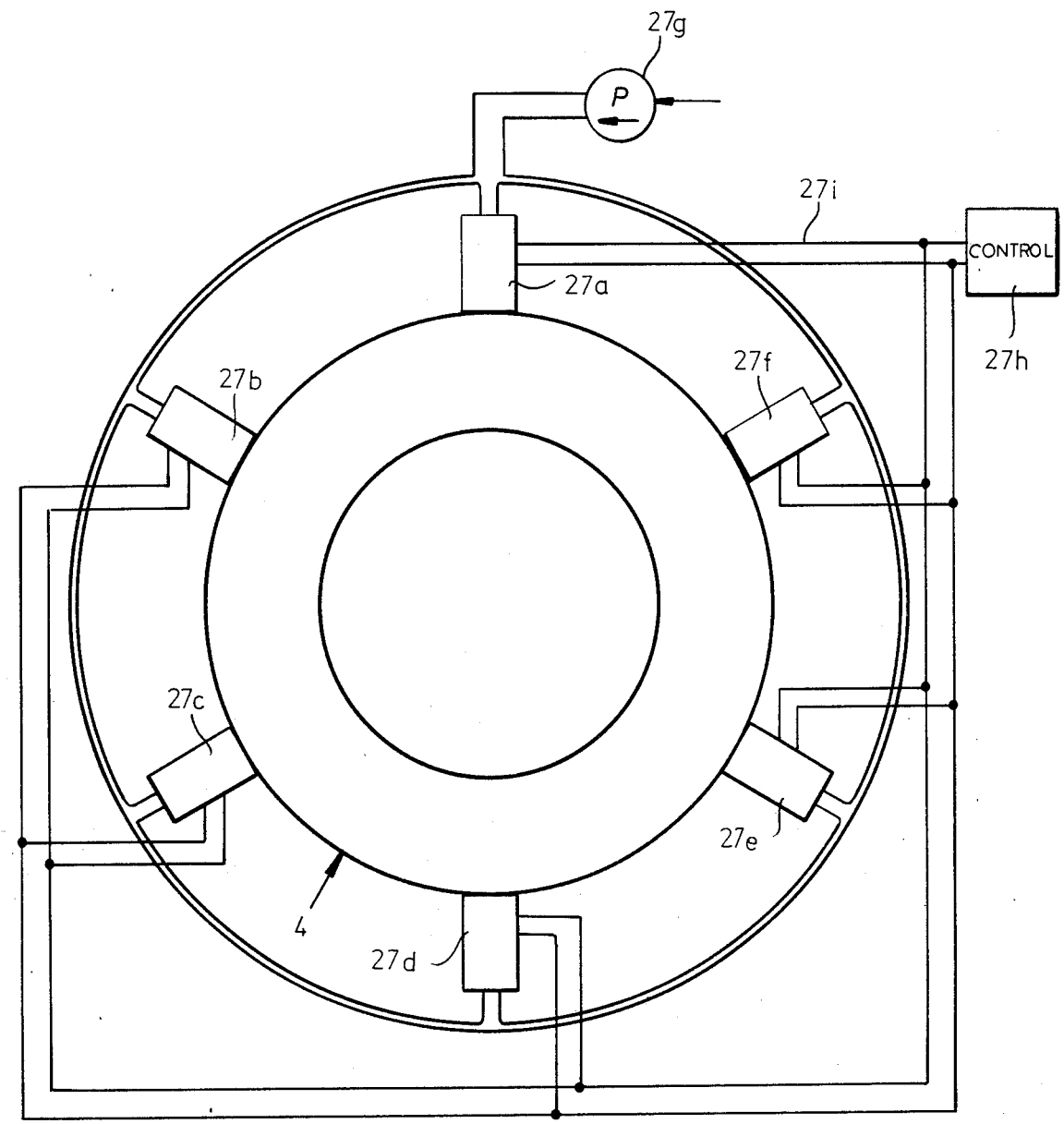
FIG. 7 is an end view illustrating a plurality of valves.

As will be seen in FIG. 7, the brake of FIGS. 1 and 2 can also have a multiplicity of valves 27a -27f angularly equispaced about the periphery of the housing and close to the common chamber in which they open. These valves 27a 14 27f are disposed in a radial plane of the chamber and can be simultaneously energized and deenergized by the control 27h via the conductor network 27i to release and actuate the brake shoes. The valves are supplied in parallel by the compressed air source 27g.

The arrangements according to the instant invention have extremely fast reaction time. In addition they can be counted on to hold the two parts they are connected between very tightly, with no backlash whatsoever.

I claim:

1. A holding brake effective between a rotating part and a nonrotating part of a manipulator, said brake comprising:

a substantially nondeformable brake disk secured to one of said parts, centered on an axis corresponding to the axis about which the rotating part turns relative to the nonrotating part, and having a pair of axially oppositely directed and annular brake-disk faces centered on the axis;

a housing secured to the other of said parts, at least partially surrounding said brake disk, and having a pair of end walls having wall faces axially confronting the respective disk faces;

respective brake elements limitedly axially displaceable independently of each other between said wall faces and the respective disk faces and having annular brake-element faces centered on the axis and flatly axially engageable with the respective disk faces;

means including formations on said elements and housing for rotationally coupling said elements and said housing and preventing relative rotation between said elements and said housing;

biasing means including respective similar pluralities of springs angularly equispaced about the axis and axially compressed between each of said brake elements and the respective wall face for normally urging said elements with a substantially constant force axially together into braking engagement with said disk and thereby normally locking the disk against rotation in the housing;

seal means between said brake elements and between said brake elements and said housing for defining an annular pressurizable chamber between said brake elements centered on the axis radially offset from said disk and said disk faces, the axial width of said chamber being substantially less than the thickness of said disk between said disk faces; and means disposed along the periphery of said chamber and including at least two valves angularly equispaced about the axis for admitting a fluid under pressure radially at respective angularly equispaced locations into the chamber and thereby pressurizing said chamber and moving said elements axially apart and substantially instantaneously out of braking engagement with said disk.

2. The brake defined in claim 1 wherein a multiplicity of said valves are disposed around and in communication with said chamber and are connected to simultaneously pressurize same.

3. The brake defined in claim 1 wherein said biasing means includes respective pluralities of spring packs angularly equispaced about said axis between said elements and the respective wall faces.

4. The brake defined in claim 1 wherein said chamber lies radially outside said disk and is radially outwardly delimited by said housing.

5. The brake defined in claim 1 wherein said elements have element faces engageable with the respective disk faces, said biasing means being radially mainly between said element faces and said chamber.

6. The brake defined in claim 1 wherein said chamber lies radially outside said disk and is radially outwardly delimited by said housing, said seal means including respective seal rings carried on said elements and radially outwardly engaging said housing between said walls thereof.

7. The brake defined in claim 6 wherein one of said elements has a hub extending axially into the other of said elements, said seal means including a seal ring between said other element and said hub of said one element.

8. The brake defined in claim 1 wherein said elements have confronting element faces radially outside said disk and formed with confronting grooves centered on said axis, said seal means including a rigid ring in said grooves and two respective seal rings axially flanking said rigid ring and sealingly engaging said elements in the respective grooves.

9. The brake defined in claim 1 wherein said chamber lies radially outside said disk and is radially outwardly delimited by said housing, said elements having beveled-off outer peripheries in said chamber.

10. The brake defined in claim 1 wherein said formations include axially aligned and confronting recesses in said elements and side walls, and respective keys snugly fitting in the confronting recesses.

11. The brake defined in claim 10 wherein said recesses of said side walls are throughgoing and said keys are fixed to said side walls.

12. The brake defined in claim 10 wherein said biasing means includes respective pluralities of spring packs angularly equispaced about said axis between said elements and the respective wall faces, said recesses angularly alternating with said packs.

13. The brake defined in claim 1 wherein one of said elements axially overreaches said disk and has an inner periphery spaced radially outside said disk.

14. The brake defined in claim 1 wherein said one part is said nonrotating part and said other part is said rotating part.

* * * * *